Figure 1:
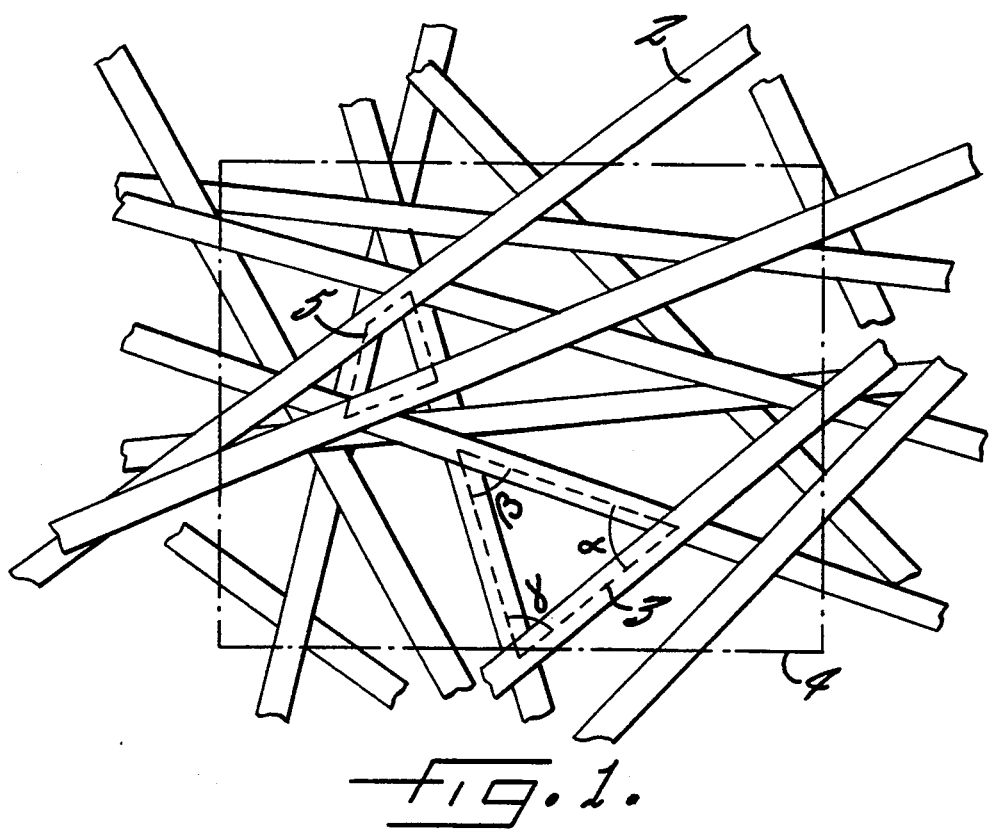

United States Patent [19]

Tel

[11] Patent Number: 5,354,097

[45] Date of Patent: Oct. 11, 1994

[54] SECURITY OF OBJECTS OR DOCUMENTS

[75] Inventor: Teunis Tel, Verlengde Hereweg 192, 9722 AM Groningen, Netherlands

[73] Assignee: Teunis Tel, Groningen, Netherlands

[21] Appl. No.: 955,711

[22] PCT Filed: Jun. 14, 1991

[86] PCT No.: PCT/NL91/00098

§ 371 Date: Dec. 15, 1992

§ 102(e) Date: Dec. 15, 1992

[87] PCT Pub. No.: WO91/19614

PCT Pub. Date: Dec. 26, 1991

[30] Foreign Application Priority Data

Jun. 15, 1990 [NL] Netherlands ............. 9001368

[51] Int. Cl.⁵ ............................. B42D 15/00
[52] U.S. Cl. .............................. 283/72; 283/83; 283/107
[58] Field of Search ............. 283/72, 73, 82, 83, 283/107

[56] References Cited

U.S. PATENT DOCUMENTS

| 3,636,318 | 1/1972 | Lindstrom et al. |
| 3,694,285 | 9/1972 | Appel et al. ............. 283/107 X |
| 4,218,674 | 8/1980 | Brosow et al. |
| 4,682,794 | 7/1987 | Margolin. |
| 5,176,405 | 1/1993 | Kaule et al. ............. 283/83 |

FOREIGN PATENT DOCUMENTS

| 0054071 | 12/1985 | European Pat. Off. |
| 0384274 | 8/1990 | European Pat. Off. |
| 1931536 | 2/1970 | Fed. Rep. of Germany. |

*Primary Examiner*—Mark Rosenbaum
*Assistant Examiner*—Willmon Fridie, Jr.
*Attorney, Agent, or Firm*—Bell, Seltzer, Park & Gibson

[57] ABSTRACT

An object or document, such as a credit card, passport, or bank note, is secured against forgery or fraud by the provision of a unique pattern of overlying individual fibers which are embedded in a sheet of transparent base material, and such that the fibers form geometrical configurations which are optically scannable through a surface of the transparent base material. The object or document is thus made unique and impossible to forge, and its authenticity may be verified by initially scanning the geometrical configurations, with the scanned information being converted into digital data which may be compressed and encrypted, and then stored in a permanent memory. Following the distribution of the object or document, an inspector may scan the object or document and compare the obtained data with the stored date to thereby verify the authenticity of the object or document.

6 Claims, 2 Drawing Sheets

SECURITY OF OBJECTS OR DOCUMENTS

The invention relates to an object or document secured against fraud. The invention also relates to a system for securing said object or document against fraud.

An object or document of the above-mentioned type can be, for example, a passport, a banker's card, a credit card, a security such as a banknote, a cheque or a share certificate, a product label, a travel card such as an airline ticket, or an admission ticket, but it can also be a painting, a compact disc, a music-, photo-, film- or video cassette, or a car.

If, by way of example, a passport is considered, it is provided with identifying marks with the object of safeguarding use of the document by making it unique and confined to one person. These identifying marks can comprise a specific layout of the document, a person's name, a passport photograph, an alphanumeric code, signatures, stamps and the like.

Another example of a document is a banknote, in the case of which efforts are made to counteract forgery by providing a watermark and other identifying marks which are difficult to copy, and also a unique serial number.

Some of the provided identifying marks are generally applied by means of very advanced equipment and techniques—in particular in the case of banknotes—in order to minimise the chance of illegal duplication of the documents. The price which has to be paid for these security measures is consequently high.

However, none of the above-mentioned measures provides adequate protection against the forgery of individual objects or documents, since in the first place the identifying marks can be copied with little or great effort. Further, when a passport is being checked the passport number or the person's name specified are used to check in a data file whether the passport number and the person's name exist and go together. This check does not, however, rule out the possibility that the person using the passport could be a different person from the one to whom the passport belongs, a fraud which can remain unnoticed through, for example, an indiscernible change of the passport photograph in the passport. It is also possible for the document itself to have been forged in such a way that this is not noticed by the authority checking it.

Secondly, a check on a specific combination of identifying marks is often impossible in practice. As already described above, it cannot be ruled out in the case of, for example, a passport that the document itself has been forged or that one of the identifying marks placed on it, such as a passport photograph, does not form a unit with the other identifying marks with which it is provided. The reason for this is that the data file forming the reference for the check contains purely alphanumeric information such as names and numbers and does not have any graphic information relating to, for example, the picture on a passport photograph or a signature.

Besides, it is generally not possible to check whether a specific object or document is genuine by means of a data file, but only by a human or mechanical assessment of a number of identifying marks of the object or document which are the same for all objects or documents, such as a line pattern, a colour, a watermark or the like.

From U.S. Pat. No. 4,218,674 a system comprising an object, in particular a document, secured against fraud is known, which object is provided with random imperfections consisting of fibers of a magnetic or magnetizable material which can be detected when measuring along a predetermined measuring track on the object. The measured imperfections are converted into a row of electric pulses and synchronised with a timing pulse also derived from marks on the object. Such a security system obviously does not function properly when the object has been subjected to external magnetic fields and therefore is of limited practical value. Besides, only a track is scanned, which provides only a limited quantity of security data for securing the object.

In the known method, the obtained security data are not combined with any data related to possible identifying marks on the object, and although the authenticity of the object can be shown by proving by way of comparison with previously recorded security data the authenticity of the security data obtained from the object, this provides no proof whatsoever of the identity of the user of the object without further precautions being taken.

Another disadvantage of the known system resides in the fact that no measures are taken to reduce the obtained quantity of security data to a more compressed form. Consequently, a relatively large storage capacity of a computer is used and a relatively long processing time will be necessary to compare a read security code with a large number of previously stored codes.

Last but not least, for an expert forger in the field of electronics and computers it does not present many problems to prepare a forged document which will produce a valid security codes and visually cannot be distinguished from an authentic one. This could be accomplished, by example, by breaking into the computer where a list of security codes is stored, by tapping the electrical connection between a measuring station and said computer, or by analysis of the magnetic properties of an authentic document.

EP-B-0 054 071 discloses an authenticator card secured against fraud, provided with identifying marks and containing a paper layer, embedded in a transparent material of which paper layer the mean translucency is different from one area to another. The translucency of predetermined areas is measured by illuminating the card from one side and scanning the card from the other side and after recording serves for ensuring the security of the card.

The object of the invention is in the first place to provide an object or document which is provided with a unique mark which cannot be copied. The object or document, which is provided with at least one identifying mark and at least one confined pattern of fibres which is incorporated in a surface of the object or document, the fibres being fixed in an arbitrary manner relative to each other and the surface, is to that end characterised by a pattern made up of a piece on nonwoven material embedded in a transparent material filling the space round said fibres, the geometrical properties of the individual fibres of the pattern being optically scannable from the side of said surface and being used for the security of said object or document against fraud.

If the pattern, in which many parts of fibres constituting the nonwoven material lie arbitrarily directed, is incorporated in a surface of an object or document, the latter is provided with a unique mark which cannot be copied. The object or document is thus itself made unique and impossible to forge; the pattern forms, as it were, the fingerprint of the object or document. For a definition of nonwovens reference is made here to international standard ISO 9092.

Great advantages of the use of nonwovens are their low thickness, the very low mass per unit volume, and the low cost.

The transparent material in which the nonwoven material is embedded can, in thin objects or parts thereof, take the form of a window where the pattern is visible both from the front and the back side.

The unique pattern must be constant in all circumstances of use, such as varying ambient temperature, humidity, mechanical stress, chemical, electric and magnetic influences and the like. It has been found that a particularly stable pattern is obtained if the core of the fibres is of polyester, and is surrounded by a polyamide covering.

The invention also provides a system for securing the object or document according to the invention, the system comprising, as is known from EP-B-0 054 071: scanning means for optically scanning the entire pattern at an angle relative to the surface in which it is incorporated; scanning means for optically scanning one or more additional identifying marks of the object or document; converting means for converting the optical information obtained by the scanning means into digital data, vice versa; data compressing means for converting the original quantity of digital data into an reduced quantity of equivalent digital data, vice versa; data encryption means for converting the reduced quantity of digital data into coded digital data, vice versa; storage means for recording the reduced quantity of digital data in a read-only memory; and comparing means for comparing the data obtained with the scanning means, the converting means, the data compressing means and the data encryption means concerning an object or a document with data previously recorded in the storage means. According to the invention the converting means are arranged to determine one or more characteristics of a polygon defined by fibre parts of the nonwoven material on the basis of the optical information, and to convert these characteristics into digital data, vice versa.

Optically scanning the pattern enables a noncontact scan wherein only the positions of the fibres play a role and imposing wear on the pattern is avoided. When the entire pattern is scanned and not just a track across the pattern, depending on the resolution with which it takes place, much information is obtained which, as a whole, is quite unique.

The scanning means—e.g. a high resolution camera—scan the pattern at an angle which for practical reasons will be close to or equivalent to 90°, but may also be chosen much less, depending mainly on the angle of refraction of the transparent material.

Apart from the pattern at least one additional identifying mark is scanned. In most cases this mark will be the appearance of the object as a whole, while in the case of an object being an identity card said mark may be a photograph of the owner.

The converting means then convert the output, e.g. pixel data, of the scanning means into a suitable form for processing the data in data compressing means, where the original quantity of digital data is converted into a reduced quantity of equivalent digital data by processing the data with predetermined algorithms. The resulting reduced quantity of digital data is then encrypted and stored in a permanent memory, where a minimal quantity of memory is required for recording the data.

The comparing means of the system enable a user to utilize the system for security checks. Such a check can be done quickly, since only reduced quantities of data need to be compared. The system may comprise central or distributed storage means to be able to use the system at arbitrary places. In both cases a copy of the stored data must be transported over large distances which involves a risk of the information falling into the wrong hands. The data encryption means render the information useless for unauthorized people.

To enable a visual check performed by a security person, the system can reassemble the original optical information from the data stored in the memory of the storage means by reverse operation of the converting means, the data compressing means and the data encryption means.

The pattern of nonwoven material comprises several layers and consequently has a three-dimensional structure. It is advantageous to scan this pattern from at least two different angles, because this produces different information which is correlated by the arrangement of the fibres, and which is more unique than the information derived from a single scanning of the pattern.

In a preferred method for putting into public circulation and checking the object or document according to the invention with the system according to the invention, prior to the issue of the object or document, the related reduced quantity of possibly coded data is recorded in the memory of the storage means, which memory is retained at a data keeper and when the object or document is being checked it is optically information thus obtained is processed by means of the converting means, the data compressing means and the data encryption means, and the resulting data is compared with the data recorded in the memory of the storage means or a copy thereof. The data keeper, an independent person or institute, plays an important role in ensuring the integrity of the data obtained prior to the issue of the object or document, and can provide material evidence that an object being checked is forged or not.

Figure 2:
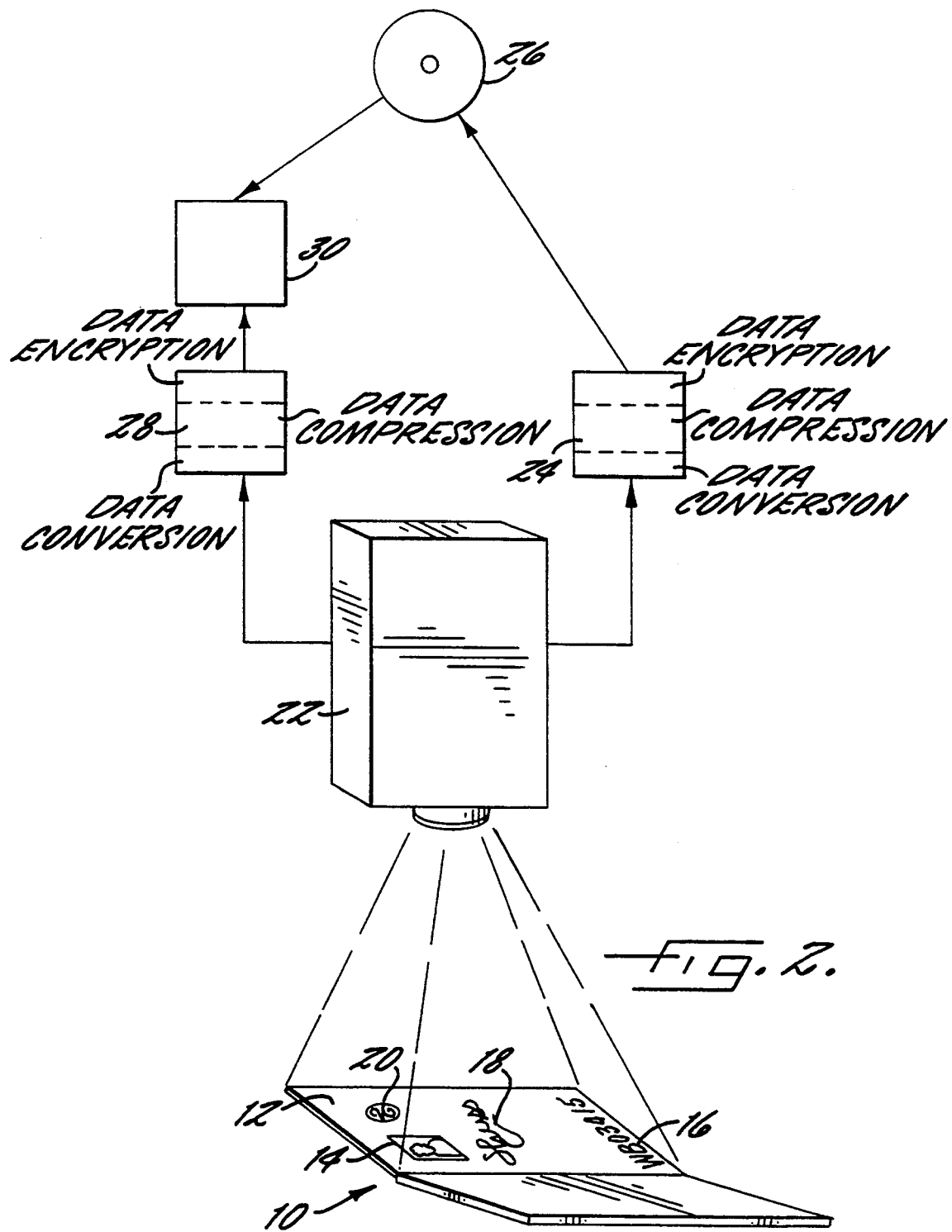

The invention is explained with reference to the drawing, in which:

FIG. 1 shows a first pattern of fibres on a greatly enlarged scale according to the invention; and FIG. 2 illustrates a method according to the invention for issuing and checking a passport.

FIG. 1 shows a part of a large, arbitrary pattern of intersecting fibres 2, which pattern continues in an arbitrary manner towards all sides outside the figure. The fibres 2 are fixed relative to each other. A confined smaller pattern is obtained, for example, by cutting through the fibres 2 along the dashed and dotted line 4. The confined pattern thus formed can be fixed in a surface of object or document.

It should be pointed out here that it is irrelevant for the invention whether or not the fibres are the same thickness as each other, whether or not the fibres are the same thickness over the entire length, whether the fibres are straight or bent, and whether or not they intersect one another.

In FIG. 1 the fibres 2 define many different polygons, two of which are indicated with dashed lines. Thus, a triangle 3 and quadrangle 5 can be recognized, which are characteristic for the specific pattern of nonwoven material. Attributes of such polygons, e.g. angles $\alpha$, $\beta$ and $\gamma$ of triangle 3, may be evaluated and used for characterization of the pattern.

FIG. 2 shows a passport 10 in which a page 12 is provided with a number of identifying marks. A passport photograph 14, an alphanumeric code 16, a signature 18 and a pattern 20 are provided on the page 12. For the sake of clarity, the pattern 20 is shown relatively large, but in a practical application the largest dimension need not be greater than a few mm.

When the passport 10 is being issued not only the passport photograph 14, but also the signature 18 and the pattern 20 of fibres on the page 12 are optically scanned by a camera 22, and after data conversion, data compression and data encryption, which operations are performed by means symbolised by block 24, the resulting coded data are stored in a permanent memory, symbolised in FIG. 2 by disk 26. Such a permanent, read-only memory may comprise an optical WORM (Write Once Read Many) device.

Disk 26 or a copy thereof can be used at the place where the check is taking place for checking passports presented at that place. The information obtained there by a check scan with camera 22, after data conversion, data compression and data encryption, jointly symbolised by block 28, is compared in comparison element 30 with the coded data stored on the disk 26, as a result of which fraud which may have occurred with the passport can be established.

It is also possible for the purpose of checking by means of data communication to consult a central memory which is accessible from several points.

If it is found during the check that one or more identifying marks of the combination of scanned identifying marks differ from those of a combination of the recorded identifying marks, it is concluded that a forged passport is being presented. If, on the other hand, the combination of checked identifying marks corresponds fully to the combination of recorded identifying marks, it is then concluded that the passport is not forged.

The coded data of at least as many identifying marks of an object or document as is necessary to established fraud is stored in the memory.

By way of example, another application of the system according to the invention is the issue of a registration certificate for a car, which is provided with a chassis number as usual, and a pattern of nonwoven material. The registration certificate is also provided with a pattern of woven material. At issuing the registration certificate together with the car both patterns and additional identifying marks are scanned and the coded scan data, together with the chassis number, are recorded in a database. This information now is inseparably combined and can be found in the database. If at a check the information is not found, the originally scanned pictures can be found and it is easily discovered where and how forgery took place.

Still another application of the system and the method according to the invention is the production of trade mark labels for clothes, etc. As a first step in the process a data keeper, also referred to as a security printer, produces for a client a series of trade mark labels with a pattern of nonwoven material and a code number. The security printer fully automatically records the pattern and the code number by means of a digital camera, axed stores the concerning coded data on a WORM optical disk. Next, the security printer delivers the trade mark labels and the optical disk or a copy thereof to the client and retains a copy of the optical disk or the original thereof, respectively. The client then processes the trade mark labels in the clothes and distributes the clothes. If there is a suspicion that certain batches of clothes are imitations, an inspector scans the label of a piece clothing with a digital camera, which scan is sent by modem in coded form to a central place, where it is compared with the data recorded on the optical disk. If the scanned data are not found in the database, it can be proven that the piece of clothing is an imitation without any doubt, since the security printer posesses the original scanned data.

In accordance with the present invention, both the security printer and his customer (i.e. the firm bringing the product to the market) may have a copy of the unique coded data for the product that is secured against forgery. Following distribution of the product, an inspector may scan the product and compare the obtained data with the stored unique coded data. In this way, not only the firm bringing the product to the market, but also the original security printer can prove the legitimacy or forgery of the product.

If the clothes are stolen and the trade mark labels are still fixed to the clothes, a proof of the batch from which the clothes originate can be established at any time.

I claim:

1. A product having provision for verifying the legitimacy of the product against forgery and comprising
    a body member including a surface, a plurality of overlying individual fibers which are randomly disposed so as to define a number of differing geometrical configurations, and a transparent base material completely encasing and fixedly supporting said fibers so that said fibers are visible on said surface and such that said surface is optically scannable through the transparent base material so as to permit the geometrical configurations of the fibers to be scanned.

2. The product as defined in claim 1 wherein at least most of said fibers comprise a polyester core and a polyamide covering.

3. The product as defined in claim 1 wherein said fibers are non-magnetic.

4. The product as defined in claim 1 wherein said body member is relatively thin and has opposite parallel surfaces, and said transparent base material extends through the thickness of said body member and such that said fibers are visible from both of said surfaces.

5. A product having provision for verifying the legitimacy of the product against forgery and comprising
    a body member including a surface, at least one identifying mark visible on said surface, a plurality of overlying individual fibers which are randomly disposed so as to define a number of differing geometrical configurations, and a transparent base material completely encasing and fixedly supporting said fibers so that said fibers are visible on said surface and such that said surface is optically scannable through the transparent base material so as to permit said at least one identifying mark and the geometrical configurations of the fibers to be scanned.

6. The product as defined in claim 1, wherein said fibers are in the form of a sheet of non-woven material which is supported by said transparent base material so that the sheet of non-woven material is generally parallel to said surface.

* * * * *